US009039958B2

(12) United States Patent
Chalabi et al.

(10) Patent No.: US 9,039,958 B2
(45) Date of Patent: May 26, 2015

(54) METAL MELTING APPARATUS

(76) Inventors: Rifat A. Chalabi, Commerce Square (GB); Ophneil Henry Perry, The Park (GB)

( * ) Notice: Subject to any disclaimer, the term of this patent is extended or adjusted under 35 U.S.C. 154(b) by 762 days.

(21) Appl. No.: 13/130,271

(22) PCT Filed: Nov. 19, 2009

(86) PCT No.: PCT/GB2009/002709
§ 371 (c)(1),
(2), (4) Date: Jun. 8, 2011

(87) PCT Pub. No.: WO2010/058172
PCT Pub. Date: May 27, 2010

(65) Prior Publication Data
US 2011/0227261 A1    Sep. 22, 2011

(30) Foreign Application Priority Data
Nov. 20, 2008   (GB) .................................. 0821258.1

(51) Int. Cl.
| C22B 1/00 | (2006.01) |
| F27D 3/00 | (2006.01) |
| C22B 7/00 | (2006.01) |
| C22B 21/00 | (2006.01) |
| F27B 19/02 | (2006.01) |
| F27D 3/14 | (2006.01) |
| F27D 27/00 | (2010.01) |
| C22B 9/22 | (2006.01) |

(52) U.S. Cl.
CPC . *C22B 7/003* (2013.01); *C22B 1/00* (2013.01); *C22B 21/0092* (2013.01); *F27B 19/02* (2013.01); *F27D 3/14* (2013.01); *F27D 27/005* (2013.01)

(58) Field of Classification Search
CPC ........ C22B 1/00; C22B 1/005; C22B 21/007; C22B 34/1204; C22B 9/16; C22B 9/22; C22B 9/221; C22B 7/00; C22B 7/003; C22B 7/14; F27D 3/10; F27D 3/14; F27D 2003/0054; F27D 2003/0055
USPC .................................... 266/24, 212, 236, 237
See application file for complete search history.

(56) References Cited

U.S. PATENT DOCUMENTS

| 3,276,758 A | 10/1966 | Baker et al. |
| 2007/0108674 A1 | 5/2007 | Yu et al. |

FOREIGN PATENT DOCUMENTS

| GB | 1424906 | 2/1976 |
| GB | 2072819 | 10/1981 |
| JP | 3120322 A | 5/1991 |

(Continued)

OTHER PUBLICATIONS

International Search Report and Written Opinion dated Mar. 7, 2011 from the corresponding International Application No. PCT/GB2209/002709 filed Nov. 19, 2009.

(Continued)

*Primary Examiner* — Lois Zheng
(74) *Attorney, Agent, or Firm* — Young Basile Hanlon & Macfarlane P.C.

(57) ABSTRACT

A refractory well (16) for melting scrap metal pieces into a molten metal bath, comprises an inlet (18) for introducing metal into said well, the inlet being located so as to cause a circular flow of molten metal in said well, an outlet (19) for the flow of metal from said well and an electromagnetic pump (22) located beneath the refractory well for pumping said molten metal from said well through said outlet.

28 Claims, 5 Drawing Sheets

(56) References Cited

FOREIGN PATENT DOCUMENTS

| | | |
|---|---|---|
| JP | 07268504 A | 10/1995 |
| KR | 100696240 B | 3/2007 |
| WO | 0233339 A1 | 4/2002 |
| WO | 2004/101830 A1 | 11/2004 |

OTHER PUBLICATIONS

International Search Report under Section 17(5) of the Patents Act 1977, dated Mar. 5, 2009, Application No. GB0821258.1.

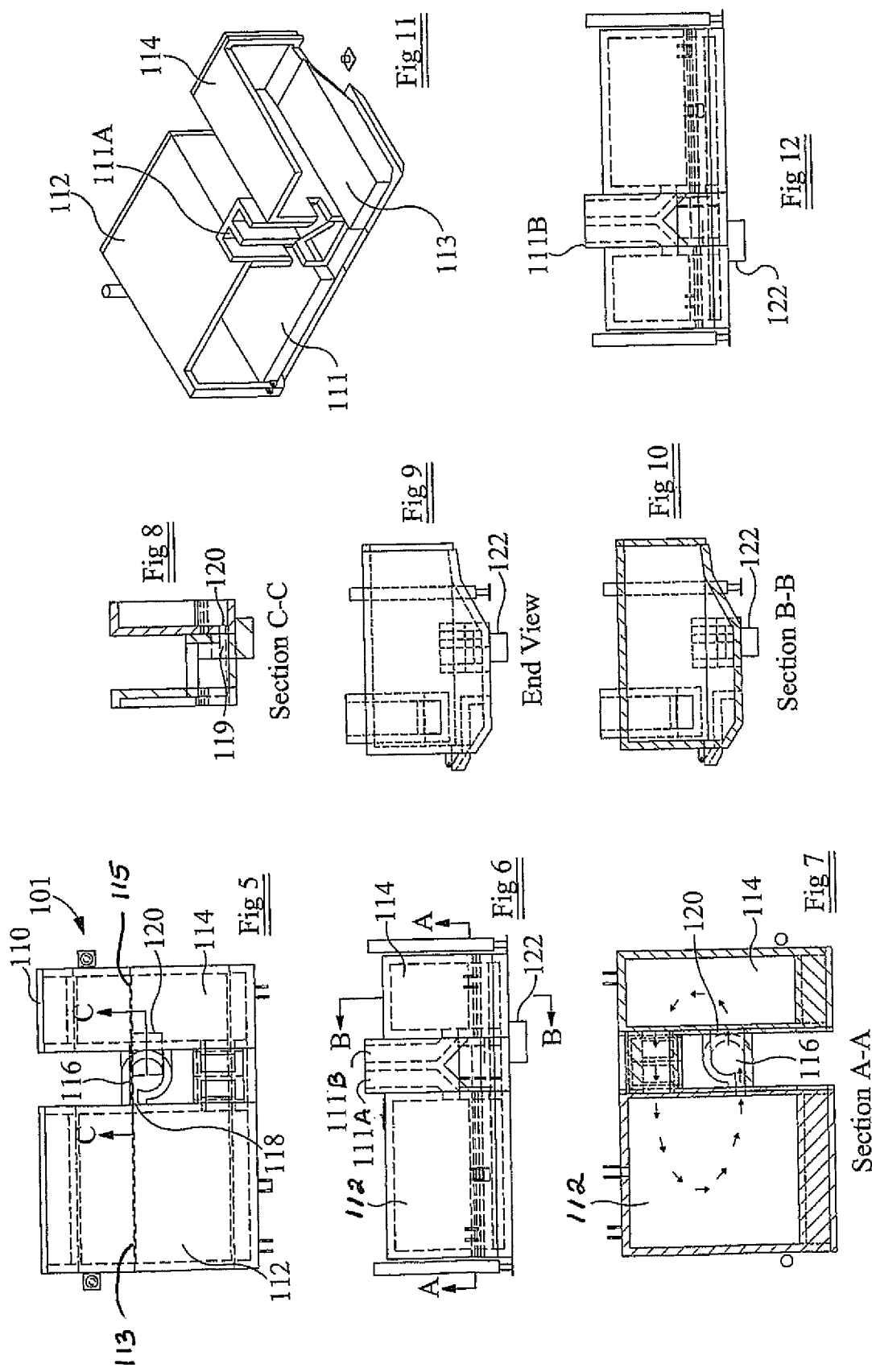

METAL MELTING APPARATUS

The present application is a National stage entry from PCT/GB2009/002709 having a filing date of Nov. 19, 2009 and claims priority to GB 08212558.1 filed Nov. 20, 2008.. The present invention relates to a refractory well for melting scrap metal pieces into a molten metal bath.

The present invention seeks to provide an improved refractory well for melting scrap metal pieces into a molten metal bath.

Accordingly, the present invention provides a refractory well for melting scrap metal pieces into a molten metal bath, comprising: an inlet for introducing metal into said well, said inlet being located so as to cause a circular flow of molten metal in said well; an outlet for the flow of metal from said well; and an electromagnetic pump located beneath the refractory well for pumping said molten metal from said well through said outlet.

In a preferred form of the invention the electromagnetic pump is located so as to apply a force to said metal downstream of at least one of said inlet and said outlet thereby to draw said metal through said well.

Preferably an outlet passage connects with said outlet and the electromagnetic pump is located adjacent the outlet or outlet passage of said well.

Preferably an outlet passage connects with said outlet and the electromagnetic pump is located vertically below at least one of the outlet and outlet passage of said well.

Preferably the inlet is arranged to direct molten metal into said well tangentially thereof so as to create a vortex in said metal in said well.

The inlet may be formed as an elongate opening extending at least a portion of the height of the cavity, as an elongate opening extending from adjacent the base of the cavity, or as an elongate opening extending the height of the cavity.

Preferably the outlet is formed as a horizontal rectangular slot located at or adjacent the bottom of said cavity, or as a horizontal rectangular slot located adjacent the base of said cavity, or as a horizontal rectangular slot opening into a side wall of said cavity.

Preferably the outlet extends downwardly from the base of said cavity.

Preferably the well further comprises bypass means for conducting molten metal past said outlet, said bypass means being arranged so as to enable heat transfer from metal in said bypass to said well at or adjacent said outlet thereby to minimize the risk of metal blockage in said outlet.

Preferably said outlet and said bypass open into said outlet passage adjacent one another.

Advantageously said outlet is formed in a lower wall of said well opening into said outlet passage and said bypass is formed by said inlet extending across said wall and opening into both said well and said outlet passage.

The present invention also provides a method of melting scrap metal comprising: providing a refractory well having an inlet for introducing metal into said well and an outlet for the flow of metal from said well; causing a downward, circular flow of molten metal in said well towards said outlet of said well; introducing the scrap metal into said molten metal flow; and applying a pumping force to said molten metal at a location thereby to cause said metal to be drawn and not pushed through said outlet.

Conveniently the electromagnetic pump is located so as to apply a force to said metal downstream of at least one of said inlet and said outlet thereby to draw said metal through said well.

Preferably the method comprises directing molten metal into said well tangentially thereof so as to create a vortex in said metal in said well.

Advantageously the molten metal is directed into said well tangentially thereof along at least a portion of the height of the cavity, or adjacent the base of the cavity, or over the height of the cavity.

Preferably the method further comprises conducting molten metal through a bypass past said outlet, so as to enable heat transfer from metal in said bypass to said well at or adjacent said outlet thereby to minimize the risk of metal blockage in said outlet.

Preferably said outlet and said bypass open into said outlet passage adjacent one another.

The present invention will now be described by way of example with reference to the accompanying drawings, in which:

FIG. 5 shows a further embodiment of the present invention;

FIG. 6 shows a rear view of the embodiment as shown in FIG. 5;

FIG. 7 shows a section through A-A of FIG. 6;

FIG. 8 shows a section through C-C;

FIG. 9 shows an end view of the embodiment of FIG. 5;

FIG. 10 shows a section B-B of the FIG. 6;

FIG. 11 shows a perspective cut-away view of the embodiment of FIG. 5;

FIG. 12 shows a front view of the embodiment of FIG. 5;

Figure 1:
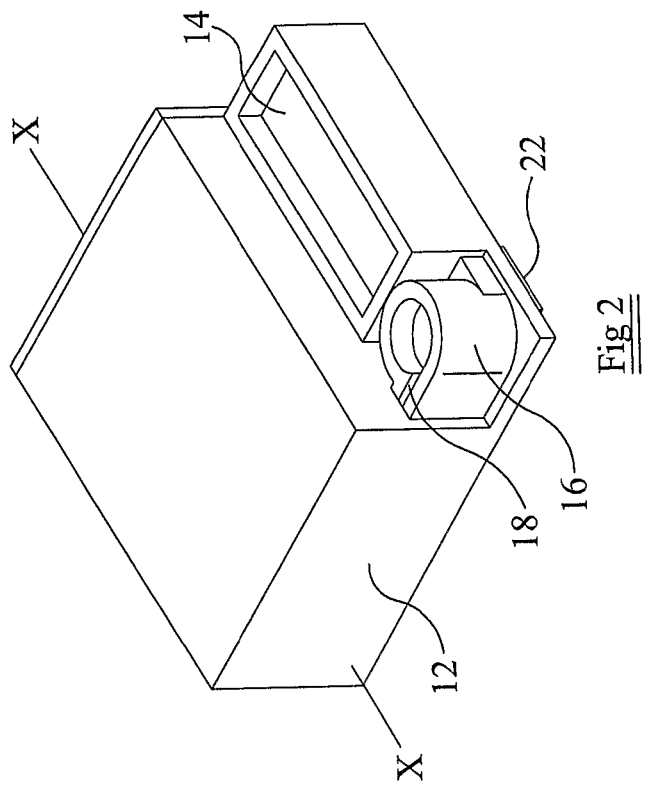
FIG. 1 shows a plan view of the apparatus according to an embodiment of the present invention.
Figure 2:
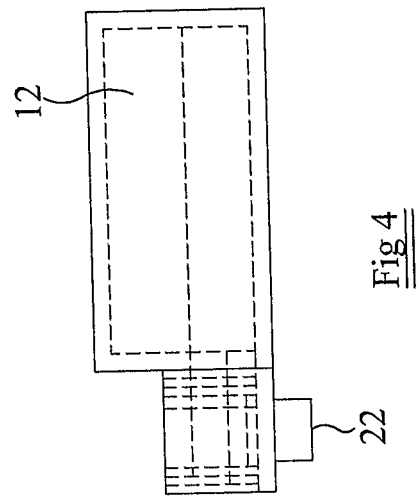
FIG. 2 shows a perspective view of the embodiment of FIG. 1.
Figure 3:
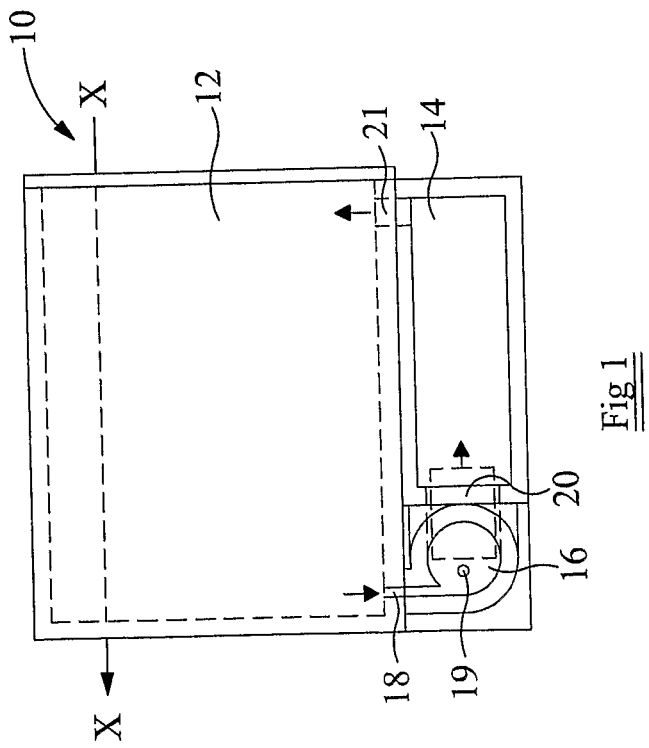
FIG. 3 shows a side elevation of the embodiment as shown in FIG. 1.
Figure 4:
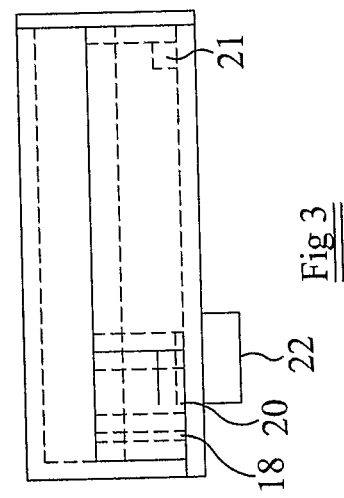
FIG. 4 shows a further side elevation of the embodiment shown in FIG. 1.
Figure 13:
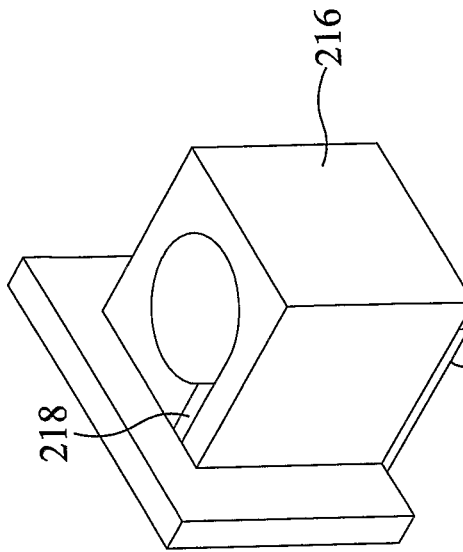
FIG. 13 shows a further embodiment of refractory well in plan view.
Figure 14:
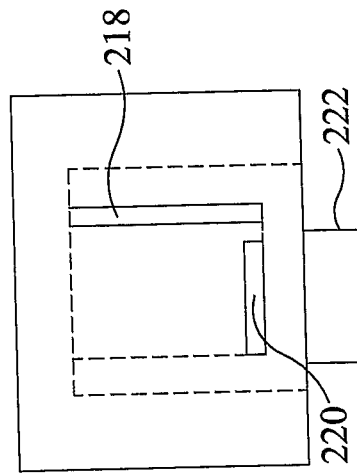
FIG. 14 shows a perspective view of the refractory well of FIG. 13.
Figure 15:
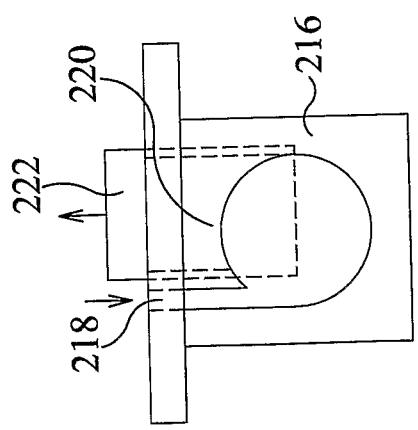
FIGS. 15 to 17 show various side elevations of the refractory well as shown in FIG. 13.
Figure 16:
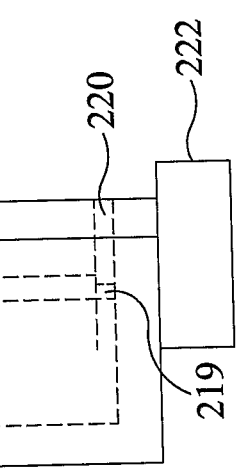
Figure 17:
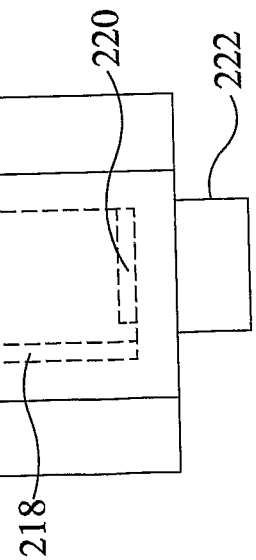
Figure 19:
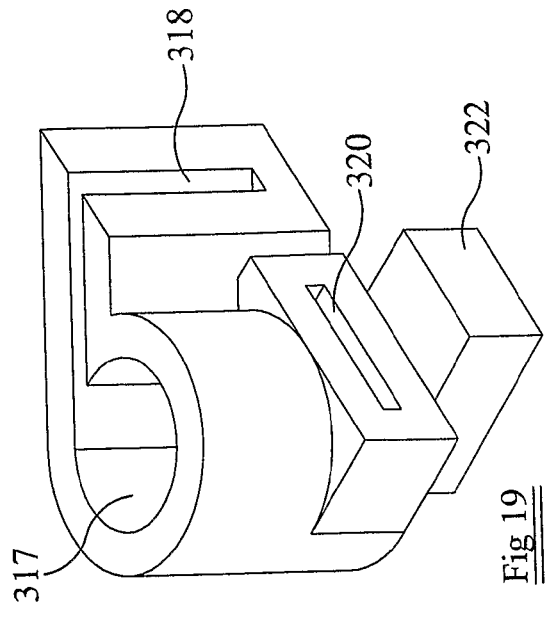
FIG. 19 shows a perspective view of the refractory well of FIG. 18.
Figure 21:
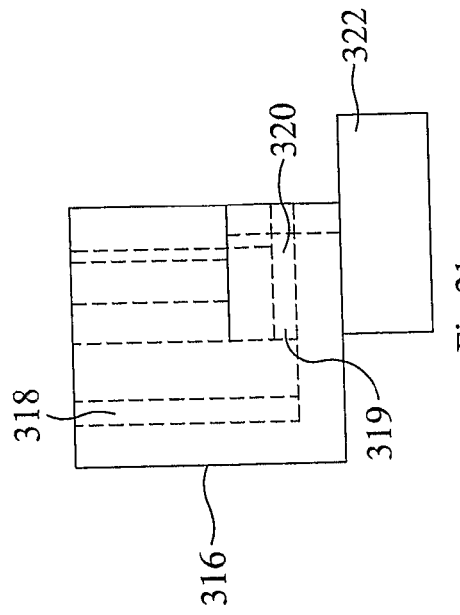
FIGS. 20 and 21 show side views of the refractory well of FIG. 18.
Figure 18:
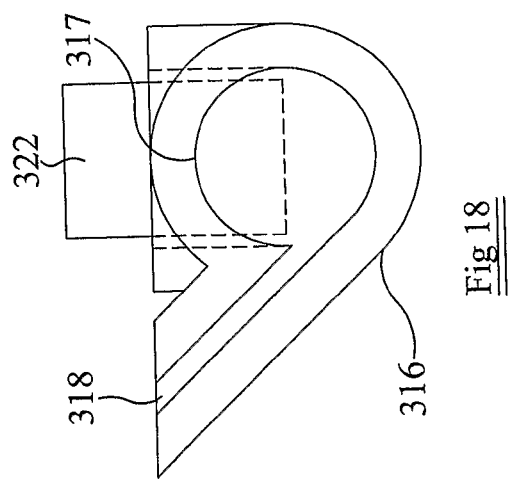
FIG. 18 shows a further embodiment of refractory well.
Figure 20:
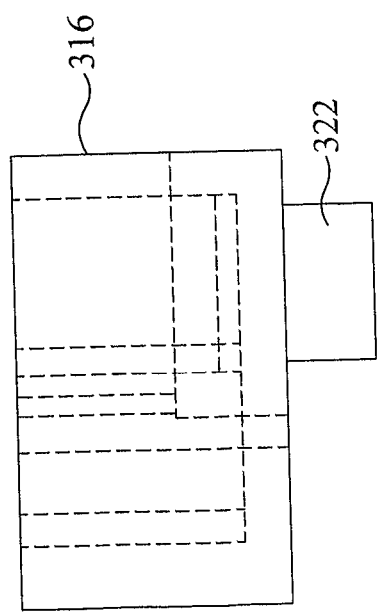
Figure 24:
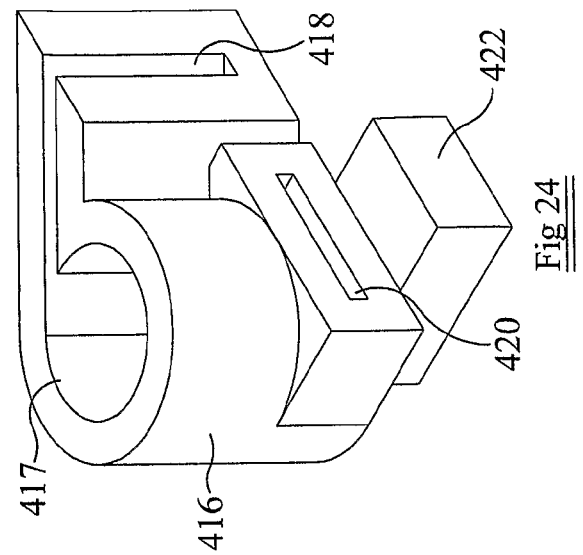
FIG. 24 shows a perspective view of the refractory well of FIG. 22.
Figure 26:
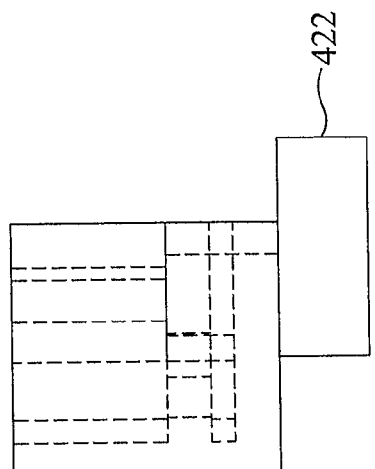
FIGS. 25 and 26 show side views of the refractory well of FIG. 22.

FIG. 1 shows an aluminum recycling furnace 10 comprising a main chamber 12 connected to a dross well 14 and a refractory well 16, sometimes referred to as a vortex bowl. The main chamber 12 is a main furnace chamber which contains molten hot metal such as molten aluminum. Molten metal is allowed to flow into the refractory well 16 via an inlet 18 and then from the refractory well 16 into the dross well 14 via an outlet 19 of the refractory well 16 into an outlet passage 20. The metal then flows back into the main chamber 12 via an outlet 21. The outlet passage 20 is shown with its axis horizontal but any angle which allows metal flow would be suitable.

The refractory well 16 is generally cylindrical in shape and the inlet 18 is generally tangential to the refractory well 16 such that as the molten metal flows into the main chamber 12 it tends to cause circulatory motion typically in the form of a vortex in the refractory well 16. Scrap metal such as aluminum chips are fed into the refractory well 16 from above, typically from a conveyor (not shown). Although the refractory well 16 is shown as cylindrical it will be appreciated that any suitable shape may be used. For example, the base of the refractory well 16 may be curved or funnel shaped to direct metal flow towards and through the outlet 19. The outlet 19 of the refractory well 16 may also be shaped or restricted in cross section to assist in the formation of the vortex.

The metal movement in the refractory well 16 produces a downward vortex action for the metal flow. This metal flow pattern forces the scrap materials, which are continuously introduced into the top of the refractory well 16, to become quickly submerged below the metal surface. Because generally the surface area to volume ratio of the scrap materials is quite high, the scrap would otherwise tend to sit on the surface of the molten metal and be subject to oxidization. The conveyor feeds scrap into the refractory well 16 at a uniform rate which is less than or equal to the thermal capacity of the furnace in order to maintain the temperature of the metal at a suitable level.

The molten metal then flows from the refractory well 16 through the outlet passage 20 to the dross well 14. In the dross well 14, further metal processing or treatment can be carried out before the molten metal is passed back into the main chamber 12 for final heating to the furnace operating temperature. The outlet passage 20 of the refractory well 16, in the illustrated embodiment, is located in the side wall of the refractory well 16 although it could also equally be located in the base of the refractory well 16 allowing the metal to flow downwardly, out of the refractory well 16, to assist in the production of a vortex motion.

In order to pump the molten metal from the refractory well 16 to the dross well 14, the metal melting apparatus is provided with an electromagnetic pump 22 which is located under the refractory well 16. The apparatus may be supported in a manner allowing it to be tilted around axis X in order to allow access to the electromagnetic pump 22 for servicing and the like.

The outlet 21 between the dross well 14 and the main chamber 12 is provided at or adjacent the bottom of the dross well 14 at an end or location preferably remote from the outlet passage 20 of the refractory well 16.

The molten metal in the main chamber 12 is generally hottest at its uppermost surface and coolest at its lowermost surface.

The inlet 18 to the refractory well 16 can be of any suitable shape but preferably is generally elongate, extending vertically. The inlet 18 may extend for part or the whole of the height of the refractory well 16 and ideally extends the full height. This allows the molten metal to flow freely into the refractory well 16 and also enables the furnace to continue operating with relatively low levels of molten metal, even when dross is formed on the molten metal surface.

By providing the electromagnetic pump 22 under the refractory well 16, it is possible for high quantities of molten metal levels to be pumped from the refractory well 16 to the dross well 14. The electromagnetic pump 22 can be located immediately beneath the outlet 19 or outlet passage 20 or downstream of the outlet 19 or outlet passage 20. The electromagnetic pump 22 is thus located so as to apply a movement force to the molten metal which lies upstream of the inlet 18 to the refractory well 16, and preferably upstream of the outlet 19 or outlet passage 20, such that the molten metal is drawn through the refractory well 16 rather than pushed. In effect, the electromagnetic pump 22 applies a tensile force to the molten metal to draw it through the outlet 19 and preferably outlet passage 20. In this way, blockages in the inlet 18 or outlet 19 or outlet passage 20 which could cause overflow in the refractory well 16 are avoided. The location of the electromagnetic pump 22 externally of the well also makes maintenance and repair of the electromagnetic pump 22 relatively easy.

FIGS. 5 to 12 show a second embodiment of the apparatus of the present invention. The apparatus 101 comprises a main chamber 112, a refractory well 116 and a dross well 114. In the embodiment shown, the dross well 114 comprises a door 110 located at one end of the dross well 114. In the embodiment shown, the refractory well 116 has a connection or passageway 120 between the refractory well 116 and the dross well 114 which is located midway along one side of the dross well 114.

As shown in FIG. 6, flues 111A and 111, B are provided and connected to main chamber 112 and dross well 114 respectively to allow any gases to escape from the main chamber 112 and the dross well 114, which as can be seen in FIG. 11 are closed units.

An electromagnetic pump 122 is provided under the refractory well 116 in the area under the connection between the refractory well 116 and the dross well 114. In FIG. 7, the flow of molten metal can be seen as indicated by the arrows which show a flow of molten metal from the main chamber 112 through the refractory well 116 to the dross well 114 and returning to the main chamber 112.

As shown in FIG. 11, each of the main chamber 112 and the dross well 114 are substantially box shaped, having planar side walls and planar upper and lower walls respectively. As shown in FIG. 11, which is a cut away image of the embodiment of FIG. 5, the levels of the molten metal 111, 113 can be seen in each of the main chamber 112 and the dross well 114 respectively.

FIGS. 13 to 17 show a further embodiment of refractory well 216 which comprises a tangential inlet 218, an outlet 219, and outlet passage 220. An electromagnetic pump 222 is provided under the refractory well 216. In this alternative refractory well 216, both the inlet 218 and the outlet passage 220 are provided on the same side of the refractory well 216. This alternative refractory well 216 may be used as a bolt on option to a metal melting apparatus.

FIGS. 18 to 21 show a further embodiment of refractory well 316 which shares a number of features in common with the embodiments shown in FIGS. 1 to 17. In particular, the refractory well comprises a cylindrical well or cavity 317 and also an inlet 318 formed as an elongate slot. The inlet 318 when provided with the long slot ensures that molten metal from both the top and bottom of the main chamber can be drawn into the refractory well 316. The outlet 319 of the refractory well 316 is formed as a rectangular, horizontally aligned slot. The electromagnetic pump 322 is located under the refractory well 316 and preferably under the outlet 319 or just downstream of the outlet 319 or outlet passage 320. The outlet 319 is located at the bottom of the refractory well 316.

Figure 23:
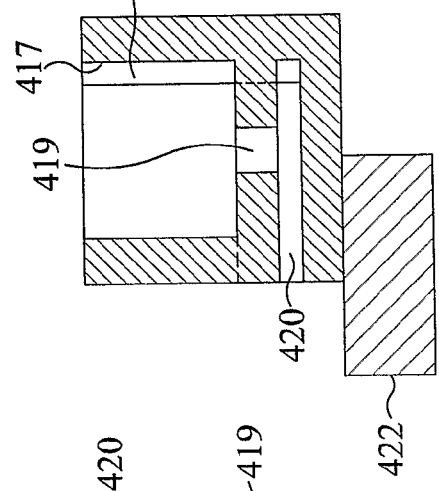
FIG. 23 shows a section A-A of FIG. 22.
Figure 25:
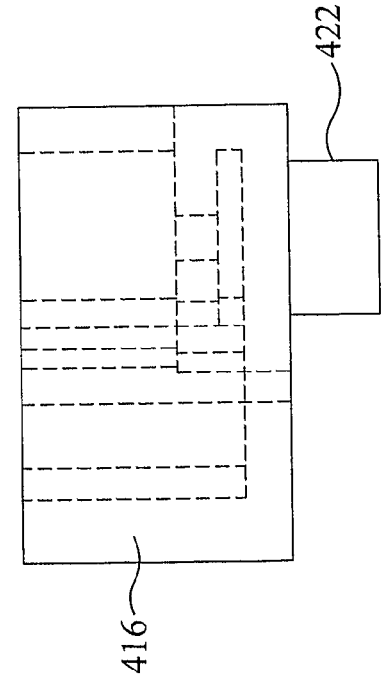
Figure 22:
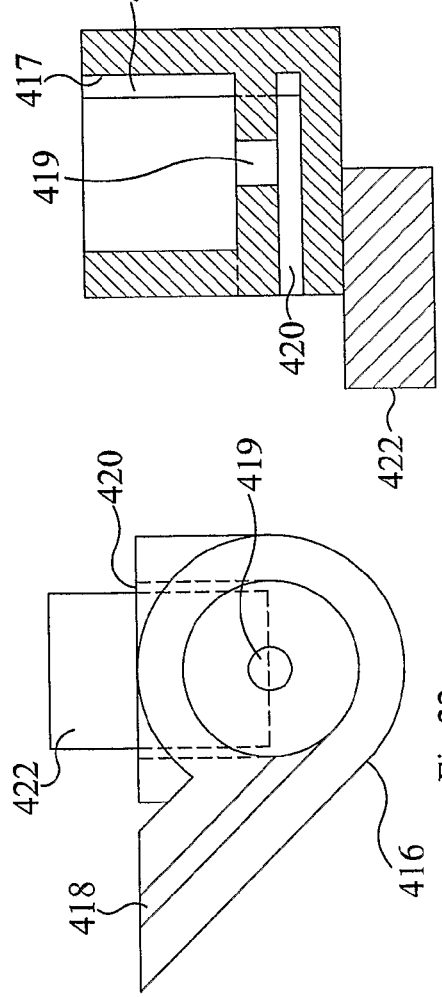
FIG. 22 shows a further embodiment of refractory well.

FIG. 22 shows a further embodiment of refractory well 416 comprising an inlet slot 418, an outlet 419 and an outlet passage 420. An electromagnetic pump 422 is provided and located under the refractory well 416, preferably under the outlet 419 and/or outlet passage 420 or just downstream of the outlet 419 or outlet passage 420. As shown in FIG. 23 which is a Section on A-A of FIG. 22, the outlet 419 of the refractory well 416 is in the form of a restriction at the bottom of the cylindrical chamber 417 of the refractory well 416 which assists in the formation of the vortex produced by the flow of molten metal through the inlet 418.

As can be seen in FIG. 23, a bypass 423 is formed from the inlet 418 to the outlet passage 420, bypassing the outlet 419. This is effected conveniently by extending the inlet 418 from the top of the well down to the outlet passage 420. This arrangement allows some of the molten metal from the main chamber 412 to bypass the refractory well 416 and outlet 419 and flow directly past the outlet 419 into the outlet passage 420, preferably mixing with molten metal passing through the outlet 419. This has the advantage of heating metal in and around the outlet 419. In instances where the solid metal dropped into the well does not melt sufficiently before entering the outlet 419 the outlet can become partially or fully blocked. Providing the bypass 423 adjacent the outlet to allow molten metal to flow past the outlet results in heat being applied to the metal around the outlet, preventing a blockage from forming. It will be appreciated that provided the separation of the bypass metal and the outlet 419 is small enough to allow heat transfer from the bypass metal to the metal in the outlet 419, the risk of blockage is minimized.

The above described preferred embodiments of the invention have advantages over the known art in that, firstly, in the known art generally high levels of molten metal have to be maintained in the main chamber whereas with the present invention, quite low levels of molten metal can be accommodated and processed.

The positioning of the electromagnetic pump, drawing the molten metal out of the refractory well avoids blockages in the outflow which tend to occur when the molten metal is "pushed" through the outlet, resulting in overflowing of the refractory well.

In the present invention, the electromagnetic pump can be located immediately beneath the outlet, where this is to one side of the refractory well or in the base, which is simply not possible in the conventional apparatus.

The positioning of the electromagnetic pump also provides for a more efficient operation and faster transfer of molten metal through the outlet of the refractory well.

It will be appreciated by those skilled in the art that features of any of the embodiments described are interchangeable between embodiments and any feature of any embodiment may be combined with features of any other embodiment.

A major disadvantage of known apparatus is the tendency of the molten metal inlet to the refractory well 16 to become blocked with dross which always forms in the aluminum recycling furnace 10. Furnace designers and furnace operators, therefore, try to minimize the amount of dross and its negative impact on the furnace operation. The dross formed in the main chamber 12 typically floats on the surface of the molten metal in the main chamber 12 due to the lower density of the dross. As a result, this floating dross is drawn by the movement of the hot metal through the inlet 18 into the refractory well 16.

However, in the present invention as described above, since the dross floats on the surface of the metal it will only block the upper portion of the vertical slot of the inlet 18, and the refractory well 16 will continue to receive molten metal through the lower part of the inlet 18. As a result, the refractory well 16 and the vortex continue to operate efficiently.

The partial blockage of the inlet 18 does not hinder the vortex well operation but in fact enhances its operation for the following reasons:

It creates an even faster flow of molten metal in the subsurface of the vortex well (to compensate for the blocked upper portion of the inlet 18). This higher velocity enhances the heat transfer into the refractory well 16 and enhances the re-melting process of scrap material.

The blockage forces results in the movement of molten metal from the main chamber 12 being from beneath the metal surface i.e. the movement is a subsurface movement. This creates less disturbance to the metal surface in main chamber 12. This typically leads to less oxidization of the aluminum in the main chamber 12 and the formation of less dross.

The blockage of the upper portion of the inlet 18 also leads to less disturbance of the main vortex surface in the refractory well 16. This lowering of the disturbance of the surface of the molten metal in the vortex leads to a combination of less oxidization in the vortex well. It also creates a heat shield in the vortex well, leading to less heat dissipation from the vortex well during operation.

The movement of the molten metal in the main chamber 12 subsurface leads to less stratification of the metal bath. This leads to a more uniform temperature distribution in the main chamber 12 which in turn leads to better quality metal produced by the furnace.

The invention claimed is:

1. A refractory well for melting solid scrap metal pieces into a molten metal bath, comprising:
    an inlet for introducing the molten metal into said refractory well from the molten metal bath, said inlet being located so as to cause a circular flow of the molten metal in said refractory well;
    an outlet for the flow of the molten metal from said refractory well;
    an electromagnetic pump located beneath the refractory well for pumping said molten metal from said refractory well through said outlet; and
    a bypass conducting a portion of the molten metal past said outlet, said bypass being arranged so as to enable heat transfer from the molten metal in said bypass to said refractory well at or adjacent said outlet thereby to minimize the risk of blockage of solid metal scraps in said outlet, the refractory well defining a cavity.

2. A refractory well as claimed in claim 1, wherein the electromagnetic pump is located so as to apply a force to the molten metal downstream of at least one of said inlet and said outlet thereby to draw the molten metal through said well.

3. A refractory well as claimed in claim 1, wherein an outlet passage connects with said outlet and the electromagnetic pump is located adjacent the outlet or outlet passage of said refractory well.

4. A refractory well as claimed in claim 1, wherein an outlet passage connects with said outlet and the electromagnetic pump is located vertically below at least one of the outlet and outlet passage of said refractory well.

5. A refractory well as claimed in claim 1, wherein the inlet is arranged to direct molten metal into said well tangentially thereof so as to create a vortex in said molten metal in said well.

6. A refractory well as claimed in claim 5, wherein the inlet is formed as an elongate opening extending at least a portion of the height of the cavity defined in the refractory well.

7. A refractory well as claimed in claim 5, wherein the inlet is formed as an elongate opening extending from adjacent the base of the cavity defined in the refractory well.

8. A refractory as claimed in claim 5, wherein the inlet is formed as an elongate opening extending the height of the cavity defined in the refractory well.

9. A refractory well as claimed in claim 5, wherein the outlet is formed as a horizontal rectangular slot located at or adjacent the bottom of said cavity defined in the refractory well.

10. A refractory well as claimed in claim 5, wherein the outlet is formed as a horizontal rectangular slot located adjacent the base of said cavity defined in the refractory well.

11. A refractory well as claimed in claim 5, wherein the outlet is formed as a horizontal rectangular slot opening into a side wall of said cavity defined in the refractory well.

12. A refractory well as claimed in claim 5, wherein the outlet extends downwardly from the base of said cavity defined in the refractory well.

13. A refractory well as claimed in claim 1 wherein said outlet and said bypass open into said outlet passage adjacent one another.

14. A refractory well as claimed in claim 1 wherein said outlet is formed in a lower wall of said refractory well opening into said outlet passage and said bypass is formed by said inlet extending across said wall and opening into both said well and said outlet passage.

15. A method of melting scrap metal comprising:
providing a refractory well having an inlet for introducing molten metal into said refractory well and an outlet for the flow of molten metal from said refractory well, and an electromagnetic pump located beneath the refractory well for pumping said molten metal from said refractory well through said refractory well outlet;
causing a downward, circular flow of the molten metal in said refractory well towards said outlet of said refractory well;
introducing solid scrap metal into said molten metal flow;
applying a pumping force to said molten metal at a location thereby to cause said molten metal to be drawn and not pushed through said outlet; and
conducting a portion of the molten metal through a bypass past said outlet, so as to enable heat transfer from said molten metal in said bypass to said refractory well at or adjacent said outlet thereby to minimize the risk of scrap metal blockage in said outlet.

16. A method as claim in claim 15, wherein the pumping force is applied by an electromagnetic pump that is located so as to apply a force to said metal downstream of at least one of said inlet and said outlet thereby to draw said metal through said well.

17. A method as claimed in claim 15, wherein the pumping force is applied by an electromagnetic pump and wherein an outlet passage connects with said outlet and the electromagnetic pump is located adjacent the outlet or outlet passage of said well.

18. A method as claimed in any of claims claim 15, wherein the pumping force is applied by an electromagnetic pump and wherein an outlet passage connects with said outlet and the electromagnetic pump is located vertically below at least one of the outlet and outlet passage of said well.

19. A method as claimed in any of claims claim 15 comprising directing molten metal into said well tangentially thereof so as to create a vortex in said metal in said well.

20. A method as claimed in claim 19, comprising directing molten metal into said refractory well tangentially thereof along at least a portion of the height of the cavity defined in the refractory well.

21. A method as claimed in claim 19, comprising directing molten metal into said well tangentially thereof adjacent the base of the cavity defined in the refractory well.

22. A method as claimed in claim 19, comprising directing molten metal into said well tangentially thereof over the height of the cavity defined in the refractory well.

23. A method as claimed in claim 15, wherein the outlet is formed as a horizontal rectangular slot located at or adjacent the bottom of said cavity defined in the refractory well.

24. A method as claimed in claim 15, wherein the outlet is formed as a horizontal rectangular slot located adjacent the base of said cavity defined in the refractory well.

25. A method as claimed in claim 15, wherein the outlet is formed as a horizontal rectangular slot opening into a side wall of said cavity defined in the refractory well.

26. A method as claimed in claim 15, wherein the outlet extends downwardly from the base of said cavity defined in the refractory well.

27. A method as claimed in claim 15 wherein said outlet and said bypass open into said outlet passage adjacent one another.

28. A method as claimed in claim 27 wherein said outlet is formed in a lower wall of said refractory well opening into said outlet passage and said bypass is formed by said inlet extending across said wall and opening into both said well and said outlet passage.

* * * * *